Patented May 26, 1936

2,042,303

UNITED STATES PATENT OFFICE 2,042,303

PRODUCTION OF ALDEHYDES

Per K. Frolich and Peter J. Wiezevich, Elizabeth, N. J., assignors to Standard Oil Development Company, a corporation of Delaware No Drawing. Application May 29, 1931, Serial No. 541,112

13 Claims. (Cl. 260—138)

This invention relates to improvements in the preparation of aldehydes, including halogenated aldehydes.

With a preferred embodiment in mind, but without intention to limit the invention more than is required by the prior art, the method comprises treating a halogenated hydrocarbon such as an aliphatic alkyl halide with an aldehyde at moderately high temperatures to produce a higher aldehyde or a higher halogenated aldehyde. The higher aldehyde or higher halogenated aldehyde is removed from the resulting mixture, and the unconverted materials are recirculated through the reaction zone. The halogenated hydrocarbon or aliphatic alkyl halide may be the chlorides, bromides or iodides of methane, ethane, propane, or the like, as for example methyl chloride, dichlor-methane, trichlor-methane, carbon tetrachloride etc. The aldehyde includes formaldehyde, acetaldehyde, propionaldehyde, benzaldehyde, or the like. The reaction is preferably carried out at a temperature between 200 to 500° C. A suitable catalyst adapted to liberate hydrogen chloride from the reacting materials may also be used for the reaction, including metal chloride such as copper chloride, aluminum chloride, bismuth chloride, calcium chloride or the like. Sulfuryl chloride also functions as a catalyst for the reaction. It has also been found advantageous to remove the hydrochloric acid formed by the reaction by a basic material such as a metal oxide, carbonate, or the like. Such materials may also act as catalysts for the reaction. For instance, the reaction can be carried out by passing the mixture of aliphatic alkyl halide and an aldehyde over calcium oxide at temperatures of from approximately 200—500° C. Pressures above atmospheric, approximately 20 to 200 atmospheres, may be employed. An inert liquid solvent may also be employed as a reaction medium.

By way of example, monochlor-methane is mixed with formaldehyde and the mixture is heated to a temperature of approximately 350° C. in the presence of copper oxide to form acetaldehyde. The acetaldehyde may be removed from the exit gas by some means such as rectification, scrubbing with a solvent, etc., and the unconverted gas may be recirculated through the reaction zone.

Dichlor-methane is mixed with formaldehyde and the mixture is heated to approximately 300° C. in the presence of sulfuryl chloride to yield monochlor-acetaldehyde and hydrogen chloride.

In a like manner, trichlor-methane and carbon tetrachloride may be made to yield dichlor-acetaldehyde and chloral, respectively.

By the procedure described, an aldehyde or a halogenated aldehyde may be prepared.

Various changes may be made within the scope of the appended claims in which it is desired to claim all novelty inherent in the invention as broadly as the prior art permits.

We claim:

1. The process of preparing compounds of the group consisting of aldehydes and halogenated aldehydes, which comprises reacting a hydrocarbon halide with a saturated alkyl aldehyde of lower molecular weight and separating the reaction products.

2. Process according to claim 1, carried out at a temperature of approximately 200° to 500° C.

3. The process of preparing compounds of the group consisting of aldehydes and halogenated aldehydes, which comprises reacting an alkyl halide with a saturated alkyl aldehyde of lower molecular weight at a temperature of approximately 200° to 500° C. and separating the reaction products.

4. Process according to claim 3, carried out in the presence of an inorganic chloride adapted to facilitate the liberation of hydrogen chloride from the reacting materials.

5. Process according to claim 3, carried out in the presence of a solid material capable of reacting with and retaining hydrogen chloride.

6. Process according to claim 3, carried out in the presence of a basic material capable of removing hydrochloric acid formed by the reaction.

7. Process according to claim 3, carried out in the presence of a basic material of the group consisting of metal oxides and carbonates.

8. Process according to claim 3, carried out at superatmospheric pressure.

9. Process according to claim 3, carried out at a pressure from about 20 to about 200 atmospheres.

10. Process according to claim 3, in which the alkyl halide treated contains only one halogen atom per molecule.

11. Process according to claim 3, in which the alkyl halide treated contains more than one halogen atom per molecule and in which the product comprises essentially halogenated aldehydes.

12. The process of preparing acetaldehyde by subjecting methyl chloride and formaldehyde to a temperature of approximately 200° to 500° C., removing the acetaldehyde and hydrogen chloride from the resulting mixture and recirculating the residual materials through the reaction zone.

13. The process of preparing chloral by subjecting carbon tetrachloride and formaldehyde to a temperature of approximately 200° to 500° C., removing the chloral and hydrogen chloride from the resulting mixture and recirculating the residual materials through the reaction zone.

PER K. FROLICH.
PETER J. WIEZEVICH.